US010503183B2

(12) United States Patent
Hill

(10) Patent No.: US 10,503,183 B2
(45) Date of Patent: Dec. 10, 2019

(54) SYSTEM AND METHOD FOR DRY FIRE PROTECTION IN ELECTRIC WATER HEATERS

(71) Applicant: BRADFORD WHITE CORPORATION, Ambler, PA (US)

(72) Inventor: Bruce Hill, Middleville, MI (US)

(73) Assignee: BRADFORD WHITE CORPORATION, Ambler, PA (US)

(*) Notice: Subject to any disclaimer, the term of this patent is extended or adjusted under 35 U.S.C. 154(b) by 184 days.

(21) Appl. No.: 15/794,379

(22) Filed: Oct. 26, 2017

(65) Prior Publication Data

US 2018/0120872 A1    May 3, 2018

Related U.S. Application Data

(60) Provisional application No. 62/413,547, filed on Oct. 27, 2016.

(51) Int. Cl.
*G05D 23/19* (2006.01)
*G08B 7/06* (2006.01)
*F24H 1/00* (2006.01)

(52) U.S. Cl.
CPC ....... *G05D 23/1917* (2013.01); *F24H 1/0018* (2013.01); *G08B 7/06* (2013.01)

(58) Field of Classification Search
None
See application file for complete search history.

(56) References Cited

U.S. PATENT DOCUMENTS 5,949,960 A * 9/1999 Hall ............... F24H 9/2021
219/481

* cited by examiner

*Primary Examiner* — Carlos R Ortiz Rodriguez
(74) *Attorney, Agent, or Firm* — RatnerPrestia

(57) ABSTRACT

A water heater system, including a water storage tank, an electrical heating element, a power switch, and a controller. The controller is configured to store a number of heating cycles completed to heat water in the tank. When electric power is applied to the water heater system, the controller controls the power switch to turn OFF power to the electrical heating element in response to the number of heating cycles being less than a threshold number of heating cycles, and controls a user output interface to output the indicator indicating that the controller is inhibiting operation of the electrical heating element, and control the power switch to turn ON power to the electrical heating element in response to receiving user input through a user input interface requesting power to be applied to the electrical heating element, and a sensed temperature of the tank being less than a setpoint temperature.

20 Claims, 3 Drawing Sheets

SYSTEM AND METHOD FOR DRY FIRE PROTECTION IN ELECTRIC WATER HEATERS

CROSS REFERENCE TO RELATED APPLICATIONS

This application claims priority to U.S. Provisional Patent Application No. 62/413,547, filed Oct. 27, 2016, the contents of such application being incorporated by reference herein.

FIELD OF THE INVENTION

This invention relates generally to a system and method for dry fire protection in electric water heaters. Specifically, the system and method protects against dry fire without the need for additional sensors.

BACKGROUND OF THE INVENTION

In operation of conventional water heaters (e.g., electric water heaters), an unwanted scenario may occur where an electric heating element of the water heater is energized when insufficient water is present in the tank (i.e., the heating element is not submerged in water). This is called a dry fire. Dry fire is unwanted, because electric heating elements may become damaged if they are energized when not submerged in water.

Conventional water heater solutions have attempted to detect and avoid dry fire scenarios. However, these solutions typically rely on additional sensors to detect the dry fire scenario. For example, a conventional water heater may employ an additional, and otherwise unneeded, water level sensor to detect the presence of water in the tank prior to energizing the heating element. This is a costly solution, because an additional sensor (e.g., water sensor) must be installed into the tank during manufacturing.

BRIEF DESCRIPTION OF THE DRAWINGS

The drawing figures depict one or more implementations in accord with the present teachings, by way of example only, not by way of limitation. In the figures, like reference numerals refer to the same or similar elements.

SUMMARY OF THE INVENTION

Figure 1:
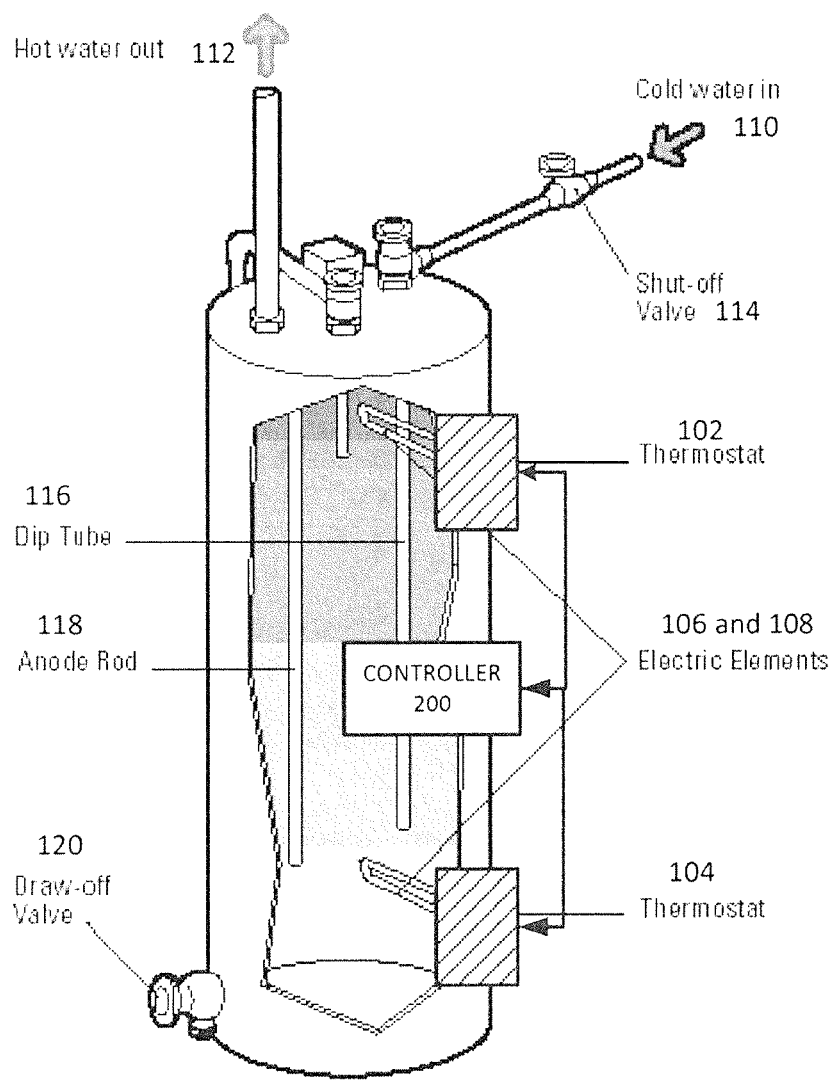
FIG. 1 shows a water heater system including a controller and two controllable thermostats.

One example includes a water heater system, including a water storage tank, at least one electrical heating element extending within the water storage tank, a power switch electrically coupled to the electrical heating element, and a controller electrically coupled to the power switch, and a temperature sensor for sensing a temperature of the water storage tank. The controller including a non-volatile memory device configured to store data including a number of heating cycles completed by the at least one electrical heating element to heat water in the water storage tank, a user output interface configured to output an indicator indicating that the controller is inhibiting operation of the at least one electrical heating element, a user input interface configured to receive input from the user requesting power to be applied to the at least one electrical heating element, and a processor. The processor configured to control the power switch to turn OFF power to the at least one electrical heating element in response to the number of heating cycles stored in the memory being less than a predetermined threshold number of heating cycles, and control the user output interface to output the indicator indicating that the controller is inhibiting operation of the at least one electrical heating element, and control the power switch to turn ON power to the at least one electrical heating element in response to: 1) receiving user input through the user input interface requesting power to be applied to the at least one electrical heating element, and 2) the sensed temperature of the water storage tank being less than a desired setpoint temperature.

Another example includes a water heater control method for controlling a water heater having a water storage tank, at least one electrical heating element extending within the water storage tank, a power switch electrically coupled to the at least one electrical heating element, a user input interface configured to receive input from the user requesting power to be applied to the at least one electrical heating element, a user output interface configured to output an indicator indicating that the controller is inhibiting operation of the at least one electrical heating element, a temperature sensor for sensing a temperature of the water storage tank, and a controller electrically coupled to the power switch. The control method including storing in a non-volatile memory device, by the controller, data including a number of heating cycles completed by the at least one electrical heating element to heat water in the water storage tank, controlling, by the controller, the power switch to turn OFF power to the at least one electrical heating element in response to the number of heating cycles stored in the memory being less than a predetermined threshold number of heating cycles, and controlling the user output interface to output the indicator indicating that the controller is inhibiting operation of the at least one electrical heating element, and controlling, by the controller, the power switch to turn ON power to the at least one electrical heating element in response to: 1) receiving user input through the user input interface requesting power to be applied to the at least one electrical heating element, and 2) the sensed temperature of the water storage tank being less than a desired setpoint temperature.

DETAILED DESCRIPTION OF EMBODIMENTS OF THE INVENTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Shown in FIG. 1 is a diagram of an electric water heater that includes an upper thermostat 102 for controlling the upper primary electric heating element 106, lower thermostat 104 for controlling the lower primary electric heating element 108, cold water intake 110, hot water output 112, shut-off valve 114, dip tube 116, anode rod 118 and draw-off valve 120. During the operation, cold water is input to the tank through cold water input 110. As the cold water fills the tank, both the upper thermostat 102 and lower thermostat 104 monitor the temperature of the sidewall of the tank. The temperature of the sidewall of the tank generally corresponds to the temperature of the water in the tank.

Controller 200 includes a user input device such as a dial, button, etc. (not shown) for manually setting a setpoint temperature in the upper and lower portion of the tank, respectively. Controller 200 also includes a user output device such as a light emitting diode (LED), liquid crystal display (LCD), speaker, etc. (not shown) for conveying information to the user. For example, the user may push an arrow button (not shown) to increase or decrease the desired setpoint temperature of the water heater. The desired setpoint temperature may then be displayed on an LCD screen.

The desired setpoint temperature on both upper thermostat 102 and lower thermostat 104 is generally set by a user manually interacting with controller 200. A respective temperature sensor (not shown) within upper thermostat 102 and within lower thermostat 104 detects the temperature of the sidewall of the tank and sends this temperature information to controller 200. Controller 200 then opens or closes an electric power circuit that drives upper and lower electric heating elements 106 and 108 respectively.

For example, if during operation, the upper thermostat 102 indicates that the water in the tank is below the desired setpoint temperature, then controller 200 turns ON upper electric heating element 106 to heat the water at the top of the tank. Likewise, if during operation, the lower thermostat 104 indicates that the temperature within the tank is lower than the desired setpoint temperature, then controller 200 turns ON lower electric heating element 108 to heat the water in the bottom of the hot water tank. In either case, the hot water produced by this heating process is output through hot water pipe 112 into the home or business in order to deliver hot water to the users.

Figure 2:
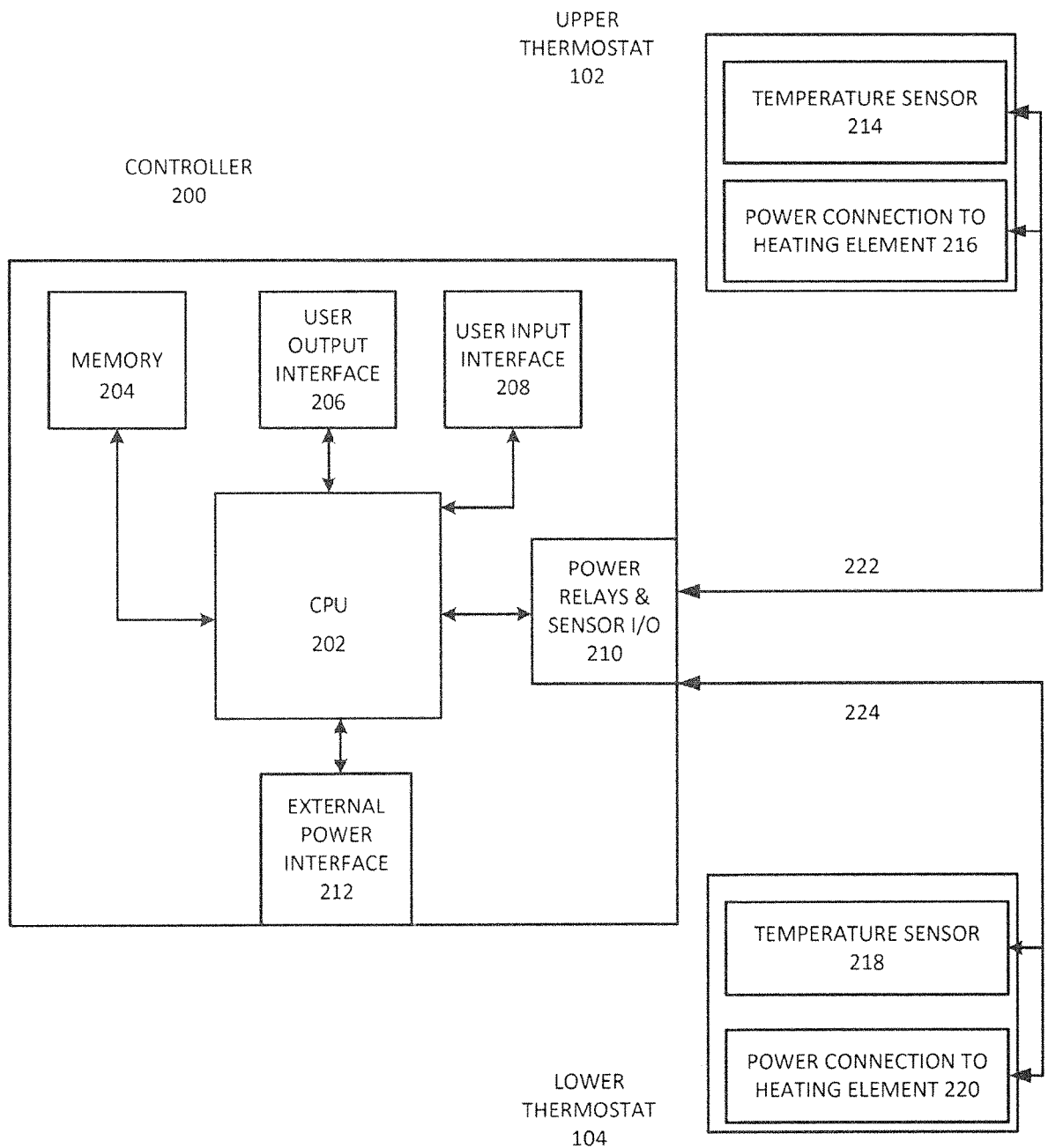
FIG. 2 shows a block diagram of the controller and thermostats in FIG. 1.

FIG. 2 shows a more detailed view of controller 200, thermostat 102 and thermostat 104 from FIG. 1. A description of these devices and their operation are as follows.

In FIG. 2, it is shown that controller 200 includes a central processing unit (CPU) 202 for controlling the water heater, a memory device 204 (e.g., non-volatile memory) for storing data and other information accessible by the CPU, user output interface 206 (e.g., LED, LCD, speaker, etc.) for outputting information to the user, and user input interface 208 (e.g., switch, button, dial, etc.) for receiving information input by the user. Controller 200 also includes device 210 having power relays (e.g., electromechanical relays, solid state relays) for supplying electrical power to the electric heating elements, and sensor input/output (I/O) that may include an analog to digital converter (ADC) for interfacing the CPU with the sensors in the thermostats. In addition, controller 200 includes an external power interface 212 (e.g., screw terminals) for connecting the controller to an external power source (e.g., residential, commercial or industrial power line).

In FIG. 2, upper thermostat 102 and lower thermostat 104 include similar internal structures. For example, upper thermostat 102 includes a temperature sensor 214 (e.g., thermistor) for detecting temperature of the upper sidewall of the tank, and a power connection 216 (e.g., screw terminals) for connecting electrical power to the upper electric heating element 106 (not shown). Lower thermostat 104 also includes a temperature sensor 218 (e.g., thermistor) for detecting temperature of the lower sidewall of the tank, and a power connection 220 (e.g., screw terminals) for connecting electrical power to the lower electric heating element 108 (not shown).

Similar to configuration shown in FIG. 1, controller 200 in FIG. 2 is electrically connected to both upper thermostat 102 and lower thermostat 104 via electrical lines 222 and 224. Electrical lines 222 and 224 may each include a power wire for transferring electrical power between controller 200 and heating element power connections 216 and 218 of the upper and lower thermostat, and a signal wire for transferring signal data between temperature sensors 214 and 218 of the upper and lower thermostat and controller 200.

Although FIG. 2 shows a specific embodiment of the controller/thermostat hardware/connections, it is noted that various other configurations are possible. In one example, the system may include one thermostat connected to controller 200. In another example, the system may include more than two thermostats connected to controller 200. In yet another example, the power relays and sensor I/O 210 may be located within the thermostats themselves. Sensors 214 and 218 in the thermostats may be analog or digital sensors. In addition, communications between CPU 202 and sensors 214 and 218 may be unidirectional or bidirectional.

During operation, a user (e.g., installer, home owner, business owner, etc.) enters a desired setpoint temperature (e.g., 120°) for the water in the tank by interacting with user input interface 208. In one example, user input interface 208 may include an up button and a down button (not shown). To set the desired setpoint temperature, the user presses the up or down button to increase or decrease the temperature. With each press of the up or down button, the user output interface indicates the current setpoint temperature. For example, the user output interface may include an LCD screen that indicates the current setpoint temperature. In another example, the user input interface 208 and user output interface 206 may be the same device (e.g., a dial). This dial may have temperature markings, and may be rotated by the user to the desired setpoint temperature.

In either scenario, once the desired setpoint temperature is set, CPU 202 receives sensed temperature data from temperature sensors 214/218 via lines 222/224 and sensor I/O 210. In one example, when sensors 214 and 218 are analog, sensor I/O 210 may be an ADC (not shown) that converts the analog signals from the sensors into digital temperature data that may be processed by CPU 202. In another example, when sensors 214 and 218 are digital, sensor I/O 210 may be a decoder (not shown) that converts the data received from the sensors into temperature data that may be processed by CPU 202.

Once the desired setpoint temperature is set, CPU 202 then determines (via sensors 214 and 218) if the water temperature is greater than or equal to the desired setpoint temperature. If the water temperature is greater than or equal to the desired setpoint temperature, then no further heating of the water is needed. However, if the water temperature is less than the desired setpoint temperature, then further heating may be required.

As discussed above, dry-fire is a potential problem that occurs when an electric heating element is powered despite the fact that the tank holds an insufficient amount of water (e.g., the heating element is not submerged in water). If an electric heating element is not submerged in water when powered up, it will likely be damaged due to overheating.

Thus, prior to engaging the power relays 210 and supplying electrical power to the upper and lower heating elements 106 and 108, CPU 202 implements a dry-fire solution in an attempt to avoid a possible dry-fire scenario. A description of this dry-fire solution is described below.

It should be noted that a heating cycle is a cycle in which the water in the tank is heated to the desired setpoint temperature. The dry-fire solution implemented by CPU 202 stores and monitors the number of heating cycles performed by the water heater over time (e.g., over the lifetime of the water heater). Based on previous heating cycles stored in memory 204, CPU 202 is able to estimate if a possible dry-fire scenario is likely.

If it is determined that a dry-fire scenario is likely, CPU 200 inhibits operation of the upper and lower electric heating elements (i.e., prevents turning ON the heating elements) and notifies the user via user output interface 206. In order to override this inhibition and permit the water heater to turn ON and initiate a heating cycle, the user must confirm that the tank is filled with adequate water by interacting with the user input interface 208 (e.g., pressing a button). Upon receiving confirmation that the tank is filled with adequate water, CPU 202 permits power relays 210 to energize heating elements 106 and 108 to heat the water in the tank, assuming the sensed tank temperature is less than the setpoint temperature.

Once temperature sensors 214 and 218 indicate that the desired setpoint temperature is reached, CPU 202 opens power relays 210 which de-energizes heating elements 106 and 108. This completes the heating cycle. After the heating cycle is complete, the temperature is still continuously monitored to ensure that the water temperature does not fall below the desired setpoint temperature. If the water falls below the desired setpoint temperature, then another heating cycle is initiated.

One benefit to this dry-fire solution, is that additional circuitry (e.g., water sensors) are not required to protect the water heater from damage. CPU 202 is able to determine that a dry-fire scenario is likely by storing and analyzing heating cycle history stored in memory 204. This solution therefore reduces the overall complexity and cost of the water heater system, as no additional hardware is required during manufacturing or installation process.

As described above, in order to determine if a dry-fire scenario is possible, CPU 202 analyzes the past heating cycle history stored in memory 204. A more detailed explanation this process is described with respect to FIG. 3.

Figure 3:
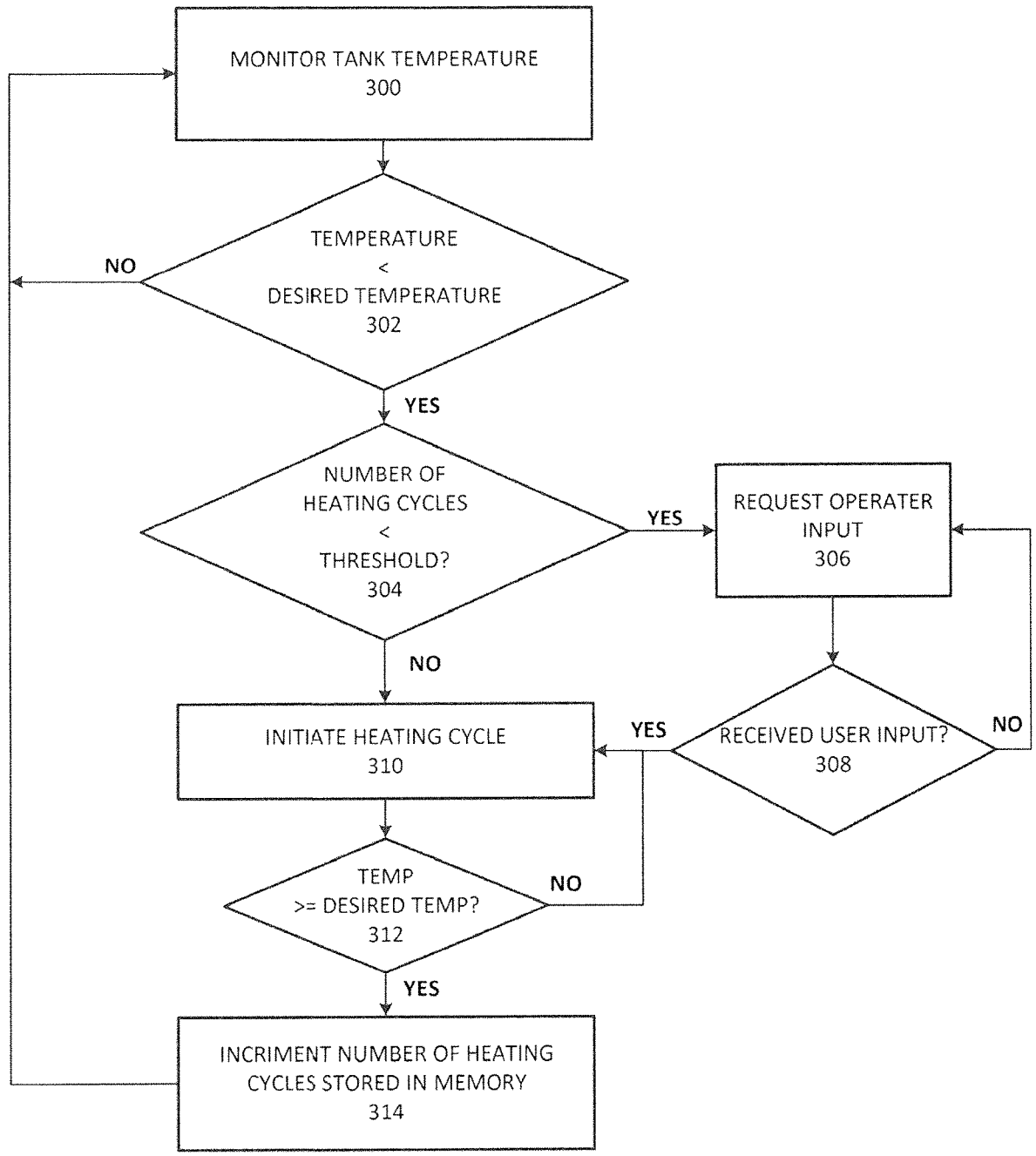
FIG. 3 shows a flowchart diagram explaining the operation of the water heater system in FIGS. 1 and 2.

FIG. 3 shows a flowchart of the overall heating cycle analysis process and dry-fire solution. In step 300, the tank temperature is monitored. More specifically, temperature sensors 214/218 (e.g., thermistors) monitor the sidewall temperature of the tank. These sensors may produce a temperature dependent modification of an electrical signal (e.g., analog voltage) that is received by sensor I/O 210 and processed (e.g., converted to a digital signal). Sensor I/O 210 then sends this digital temperature data to CPU 202 for processing.

Upon receiving the digital data, CPU 202, in step 302, compares the digital temperature data to a desired setpoint temperature stored in memory 206. It should be noted that this desired setpoint temperature is a value that was previously set by the user interacting with user input interface 208 and user output interface 206 (e.g., the user pushed a button on the controller to set the desired setpoint temperature).

If the digital temperature data is greater than or equal to the desired setpoint temperature, then CPU 202 continues to monitor the tank temperature in step 300 (i.e., additional heating is not required). However, if the digital temperature data is less than the desired setpoint temperature, then CPU 202 analyzes the number of heating cycles stored in memory 204 in step 304.

Specifically, in step 304, CPU 202 compares the number of heating cycles stored in memory 204 to a threshold (e.g., 1). If the number of heating cycles is greater than or equal to the threshold, then CPU 202 initiates the heating cycle in step 310 by closing power relays 210 and energizing electrical heating elements 106/108.

However, if the number of heating cycles is less than the threshold (e.g., the water heater has never performed a heating cycle), then CPU 202 determines that dry-fire is possible, and therefore inhibits the operation of the heating elements (i.e., CPU 202 ensures that the heating cycle will not start). In this scenario, CPU 202, in step 306, requests input from the user to confirm that the tank contains sufficient water. This can be accomplished by displaying some type of indication (e.g., flashing light, message on LCD, etc.) that notifies the user that operation is inhibited and that confirmation is required to turn on the water heater.

In step 308, if the user does not provide the requested input (e.g., push a button on user input interface 208), CPU 202 continues to inhibit operation of the water heater and continues to request user input. However, if the user does provide the requested input, CPU 202 assumes that there is adequate water in the tank and initiates the heating cycle in step 310, because CPU 202 has already determined that the tank temperature is less than the desired setpoint temperature in step 302.

The overall process described in steps 304, 306 and 308 is the dry-fire solution. This process ensures that the water heater does not automatically energize the heating elements 106/108 when the tank contains an insufficient amount of water.

For example, assume a scenario where the water heater is newly installed in a building. An electrician may connect the water heater to the electrical power source prior to the water heater being filled with water. If the water heater enters a heating cycle, this would result in dry-fire that will likely damage the heating elements.

However, by ensuring that the number of heating cycles is greater than or equal to a threshold (e.g., 1), CPU 202 is able to determine that the water heater is newly installed. For example, due to the water heater being new, the number of past heating cycles is 0 (i.e., it has never been turned ON). In this example, CPU 202 determines that the water heater is newly installed, and therefore susceptible to dry-fire. CPU 202 would then inhibit the operation of the water heater until a user (e.g., the plumber) confirms that that tank is filled with adequate water. Thus, even in a case where the electrician connects power to the water heater prior to the tank being filled, dry-fire would not occur due to the inhibition control of CPU 202 (i.e., the plumber would have to push a button on controller 202 in order for CPU 202 to permit the heating elements to be energized during a heating cycle).

Once the heating cycle is initiated in step 310, CPU determines if a heating cycle has been sufficient. For example, in step 312, CPU 202 compares the sensed temperature to the desired setpoint temperature. If the sensed temperature is less than the desired setpoint temperature, then CPU 202 continues the heating cycle. However, if the sensed temperature is greater than or equal to the desired setpoint temperature, then in step 314 CPU 202 increments the number of heating cycles stored in memory and loops back up to step 300 to repeat the process.

Although FIG. 3 shows that dry-fire solution is based on the number of heating cycles stored in memory, it should be noted that other factors may also be analyzed by CPU 202 to determine a possible dry-fire scenario. For example, the duration of the heating cycles, time between heating cycles and temperature values of the heating cycles may also be analyzed to determine dry-fire.

For example, if the number of heating cycles is greater than or equal to the threshold, but the time since the last heating cycle is long (e.g., months), the CPU 202 may determine (e.g. using an internal battery powered clock, or using a network clock) (not shown) that the water heater has been abandoned, and possibly drained of water. Thus, CPU 202, in this example, may request user input before energizing the electric heating elements to initiate any subsequent heating cycles.

In yet another example, CPU 202 (after the water heater is installed and utilized) may reset the number of heating cycles stored in memory to a value of 0 if the water heater loses power from the external power source (e.g. circuit breaker is shut off or power grid loses power). This ensures that each time the water heater is powered up (e.g. after a blackout, after being shut down due to plumbing renovations, after being disconnected and moved to a new location, etc.), the dry-fire solution is implemented by CPU 202 during power up of the water heater.

As described above, the user may acknowledge the presence of water by pushing a button. In one example, the user can push a button on user input interface 208. In an example, this can be a single momentary push, multiple sequential pushes, or even a push and hold procedure. In another example, the user input interface may not even be needed. In this example, the CPU 202 could instruct the user to toggle external power to the unit a predetermined number of times. The user can toggle an external switch (e.g., circuit breaker) at which point CPU 202 acknowledges the user's confirmation for the heating cycle to begin.

The description above along with the accompanying figures describe a dry-fire solution for a water heater system. This solution does not require additional sensors or hardware to protect against dry-fire. The solution employs a CPU to analyze details of previous heating cycles (e.g., history) that are stored in memory in order to make a determination if dry-fire is likely. If dry-fire is likely, CPU 202 inhibits operation of the heating cycle and requires a user to physically interact with the water heater in order to confirm that adequate water is present in the tank.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A water heater system, including:
   a water storage tank;
   at least one electrical heating element extending within the water storage tank;
   a power switch electrically coupled to the electrical heating element;
   a temperature sensor for sensing a temperature of the water storage tank; and
   a controller electrically coupled to the power switch, the controller including:
      a non-volatile memory device configured to store data including a number of heating cycles completed by the at least one electrical heating element to heat water in the water storage tank,
      a user output interface configured to output an indicator indicating that the controller is inhibiting operation of the at least one electrical heating element,
      a user input interface configured to receive input from the user, the input requesting power to be applied to the at least one electrical heating element, and
      a processor configured to:
         control the power switch to turn OFF power to the at least one electrical heating element in response to the number of heating cycles stored in the memory being less than a predetermined threshold number of heating cycles, and control the user output interface to output the indicator indicating that the controller is inhibiting operation of the at least one electrical heating element, and
         control the power switch to turn ON power to the at least one electrical heating element in response to:
         1) receiving user input through the user input interface, the input requesting power to be applied to the at least one electrical heating element, and
         2) the sensed temperature of the water storage tank being less than a desired setpoint temperature.

2. The water heater system of claim 1, wherein the predetermined threshold number of heating cycles is 1.

3. The water heater system of claim 1,
wherein the processor compares the number of heating cycles stored in the memory to the predetermined threshold in response to electrical power being applied to the controller.

4. The water heater system of claim 1,
wherein the processor controls the power switch to turn ON power to the electrical heating element in response to: 1) the number of heating cycles stored in the memory being greater than or equal to the predetermined threshold number of heating cycles, and 2) the sensed temperature of the water storage tank being less than a desired setpoint temperature.

5. The water heater system of claim 1,
wherein the predetermined threshold number of heating cycles is set by the manufacturer of the water heater system.

6. The water heater system of claim 1,
wherein the number of heating cycles are each determined to be complete in response to the at least one electrical heating element in the water storage tank being energized and heating the water to a desired setpoint value.

7. The water heater system of claim 1,
wherein the user output interface includes at least one indicator device triggered by the controller to output the indicator indicating that the controller is inhibiting operation of the at least one electrical heating element, the indicator device including at least one of a light emitting diode (LED), a liquid crystal display (LCD), or an audio speaker.

8. The water heater system of claim 1, including:
wherein the user input interface includes at least one of a push button, a switch, a touchscreen, or a setpoint potentiometer for receiving the input requesting power to be applied to the at least one electrical heating element.

9. The water heater system of claim 1,
wherein the processor controls the power switch to turn ON power to the electrical heating element in response to: 1) external power to the water heater system being toggled ON/OFF a predetermined number of times by a user of the water heater system, and 2) the sensed temperature of the water storage tank being less than a desired setpoint temperature.

10. The water heater system of claim 9,
wherein the external power is toggled ON/OFF by an external circuit breaker.

11. A water heater control method for controlling a water heater having a water storage tank, at least one electrical heating element extending within the water storage tank, a power switch electrically coupled to the at least one electrical heating element, a user input interface configured to receive input from the user, the input requesting power to be applied to the at least one electrical heating element, a user output interface configured to output an indicator indicating that the controller is inhibiting operation of the at least one electrical heating element, a temperature sensor for sensing a temperature of the water storage tank, and a controller electrically coupled to the power switch, the control method including:
storing, in a non-volatile memory device, by the controller, data including a number of heating cycles completed by the at least one electrical heating element to heat water in the water storage tank,
controlling, by the controller, the power switch to turn OFF power to the at least one electrical heating element in response to the number of heating cycles stored in the memory being less than a predetermined threshold number of heating cycles, and controlling the user output interface to output the indicator indicating that the controller is inhibiting operation of the at least one electrical heating element, and
controlling, by the controller, the power switch to turn ON power to the at least one electrical heating element in response to: 1) receiving user input through the user input interface, the input requesting power to be applied to the at least one electrical heating element, and 2) the sensed temperature of the water storage tank being less than a desired setpoint temperature.

12. The water heater control method of claim 11, further comprising:
storing, by the controller, the value 1 as the predetermined threshold number of heating cycles.

13. The water heater control method of claim 11, further comprising:
comparing, by the processor, the number of heating cycles stored in the memory to the predetermined threshold in response to electrical power being applied to the controller.

14. The water heater control method of claim 11, further comprising:
storing, by the controller, the predetermined threshold number of heating cycles during manufacturing of the water heater.

15. The water heater control method of claim 11, further comprising:
controlling, by the processor, the power switch to turn ON power to the electrical heating element in response to: 1) the number of heating cycles stored in the memory being greater than or equal to the predetermined threshold number of heating cycles, and 2) the sensed temperature of the water storage tank being less than a desired setpoint temperature.

16. The water heater control method of claim 11, further comprising:
determining, by the processor, the number of heating cycles to be complete in response to the at least one electrical heating element in the water storage tank being energized and heating the water to a desired setpoint value.

17. The water heater control method of claim 11, further comprising:
outputting, by the user output interface through at least one of a light emitting diode (LED), a liquid crystal display (LCD) or an audio speaker, the indicator indicating that the controller is inhibiting operation of the at least one electrical heating element.

18. The water heater control method of claim 11, further comprising:
receiving, by the user input interface through at least one of a push button, a switch, a touchscreen or a setpoint potentiometer, the input requesting power to be applied to the at least one electrical heating element.

19. The water heater control method of claim 11, further comprising:
controlling, by the processor, the power switch to turn ON power to the electrical heating element in response to: 1) external power to the water heater system being toggled ON/OFF a predetermined number of times by a user of the water heater system, and 2) the sensed temperature of the water storage tank being less than a desired setpoint temperature.

20. The water heater control method of claim 11, further comprising:
controlling, by the processor, the power switch to turn ON power to the electrical heating element in response to an external circuit breaker to the water heater system being toggled ON/OFF a predetermined number of times by a user of the water heater system.

* * * * *